(12) United States Patent
Sato et al.

(10) Patent No.: US 6,534,205 B2
(45) Date of Patent: Mar. 18, 2003

(54) MAGNETIC STORAGE MEDIUM (75) Inventors: Hisateru Sato, Kawasaki (JP); Isatake Kaitsu, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/409,553

(22) Filed: Sep. 30, 1999

(65) Prior Publication Data

US 2002/0064685 A1 May 30, 2002

(30) Foreign Application Priority Data

Mar. 23, 1999 (JP) .......................................... 11-077740

(51) Int. Cl.$^7$ .............................. G11B 5/66; G11B 5/70; B32B 15/00
(52) U.S. Cl. .............................. 428/694 T; 428/694 TS; 428/694 TC; 428/667; 428/900
(58) Field of Search ...................... 428/694 T, 694 TS, 428/694 TC, 900, 667

(56) References Cited

U.S. PATENT DOCUMENTS

| | | | | |
|---|---|---|---|---|
| 5,378,549 A | * | 1/1995 | Torii et al. | 428/694 TS |
| 5,736,013 A | * | 4/1998 | Ranjan et al. | 204/192.2 |
| 5,759,617 A | * | 6/1998 | Mukai | 427/130 |
| 5,942,342 A | * | 8/1999 | Hikosaka et al. | 428/694 R |
| 6,119,483 A | * | 9/2000 | Takahashi et al. | 65/30.14 |
| 6,156,404 A | * | 12/2000 | Ross et al. | 428/65.3 |

* cited by examiner

*Primary Examiner*—Holly Rickman
(74) *Attorney, Agent, or Firm*—Greer, Burns & Crain, Ltd.

(57) ABSTRACT

There is provided a magnetic storage medium capable of recording information at high recording density and also to regenerating the information with a high quality of signal (high S/N$_m$), and in addition contributing to the elongation of a life span of the recorded information. The magnetic storage medium comprises a non-magnetic substrate and a magnetic recording layer provided on the substrate. The magnetic recording layer has a ferromagnetic grain consisting of a ferromagnetic material and an antiferromagnetic matrix consisting of an antiferromagnetic material.

11 Claims, 5 Drawing Sheets

MAGNETIC STORAGE MEDIUM

BACKGROUND OF THE INVENTION

1. Field of the Invention

The present invention relates to a magnetic storage medium suitable for a magnetic disk unit, and more particularly to a magnetic storage medium excellent in thermal stability of magnetic information stored in the magnetic storage medium.

2. Description of the Prior Art

As recording information, which is dealt with in an information processing apparatus, is increased, it is needed to provide a magnetic storage, which is used as an external storage unit of the information processing apparatus, with a compactness and the more large capacity. For this reason, the magnetic storage needs a magnetic storage medium capable of recording at high recording density. However, according to the conventional CoCr system-alloy of thin film magnetic storage medium, it is known that as magnetic information is recorded at higher recording density, $S/N_m$ of the recorded magnetic information to the regenerative signal is lowered (the medium noise $N_m$ is increased with respect to the output S of the regenerative signal).

A one bit of magnetic information stored in a magnetic storage medium is represented by a direction of a total magnetization consisting of an assembly of the respective magnetizations of a plurality of ferromagnetic crystal particles existing in a one bit cell of the magnetic storage medium. The respective magnetizations of the plurality of ferromagnetic crystal particles are substantially unified in direction in the state that magnetic information is recorded. However, in the event that the magnetization of the adjacent one bit cell is unified in direction opposite to that of the noticed one bit cell, the direction of the magnetization is reversed through a certain width near a boundary between the adjacent one bit cell-to-one bit cell, but not rapidly changed on the boundary. In an area having such a width, magnetizations oriented in mutually different direction are mixed on a zigzag basis. This area is referred to as a magnetization transitional region. One of the causes of occurrence of the medium noise as mentioned above resides in unevenness of a magnetization in the magnetization transitional region. It is known that unevenness of the magnetization occurs owing to a magnetic interaction between ferromagnetic crystal particles indicative of ferromagnetism. In order to weaken the magnetic interaction, there is considered the CoCr system-alloy of thin film magnetic storage medium in which a segregation between a ferromagnetic portion and a non-magnetic portion is promoted in accordance with composition and preparing condition so that the ferromagnetic portion is covered by the non-magnetic portion.

As one which takes the place of the CoCr system-alloy of thin film magnetic storage medium, there is known a granular medium. The granular medium has a structure that the ferromagnetic crystal particles are distributed in the non-magnetic substance such as $SiO_2$. This structure makes it possible to substantially completely divide into parts a magnetic interaction between the ferromagnetic crystal particles. As a result, it is possible to suppress the noise (transitional noise) due to the unevenness of a magnetization in the magnetization transitional region to be substantially zero.

The medium noise occurs also owing to unevenness of a particle size of the ferromagnetic crystal particles. It is considered that the regenerative output is in proportion to the sum total of the volume of ferromagnetic crystal particles. Hence, as the average particle size of one bit cell becomes large, unevenness of a particle size becomes also large. As a result, unevenness of the regenerative output becomes large and thus the medium noise is increased. Therefore, it is considered that the medium noise $N_m$ of the magnetic storage medium is decreased in such a manner that the particle size of the ferromagnetic crystal particles is controlled in the magnetic recording layer of the magnetic storage medium, so that $S/N_m$ is improved.

However, as to the magnetization recorded on ferromagnetic crystal particles in which a magnetic interaction between the ferromagnetic crystal particles is divided into parts so that the ferromagnetic crystal particles are magnetically isolated, as the particle size of the ferromagnetic crystal particles are decreased, energy $K_u \cdot V$ (anisotropy energy×volume of particle) representative of a degree of easy orientation of magnetization of the particle in a predetermined direction is reduced. When the energy $K_u \cdot V$ is reduced, a thermal fluctuation phenomenon wherein a direction of magnetization fluctuates owing to the heat will occur. For that reason, when the particle size is less than a predetermined size, the magnetization of the respective particle involves the thermal fluctuation phenomenon, even at the room temperature. This is associated with a problem that the recording magnetization on one bit cell consisting of the total sum of pieces of magnetization disappears.

SUMMARY OF THE INVENTION

In view of the foregoing, it is an object of the present invention to provide a magnetic storage medium capable of recording information at high recording density and also to regenerating the information with a high quality of signal (high $S/N_m$), and in addition contributing to the elongation of a life span of the recorded information.

To achieve the above-mentioned objects, the present invention provides a magnetic storage medium comprising:
(1) a non-magnetic substrate; and
(2) a recording layer in which grains consisting of a ferromagnetic material are dispersed in an antiferromagnetic material.

In the magnetic storage medium of the present invention as mentioned above, grains consisting of a ferromagnetic material are dispersed in the recording layer of the above item (2). Since the magnetic interaction between the grains is substantially completely divided into part, an unevenness of a magnetization in the magnetization transitional region is small. Thus, according to the magnetic storage medium of the present invention, it is possible to regenerate magnetic information recorded at high recording density with high $S/N_m$.

In the magnetic storage medium of the present invention as mentioned above, grains consisting of a ferromagnetic material are dispersed in an antiferromagnetic material in the recording layer of the above item (2). Those grains are in contact with the antiferromagnetic material, so that an exchange interaction acts on between a magnetization of those grains and a magnetization of the antiferromagnetic material at an interface of their contact. As a result, magnetic anisotropy energy $K_u$ of those grains is apparently increased. Consequently, the magnetization of those grains is stable to the thermal fluctuation. Thus, magnetic information stored in the magnetic storage medium of the present invention is stable on a thermal basis.

In the magnetic storage medium as mentioned above, it is preferable that said antiferromagnetic material is an oxide, and said ferromagnetic material is a metallic material.

A metal and an oxide are non-solid solution. Thus, according to the magnetic storage medium having the structure as mentioned above, it is possible to expect a favorable separation between grains consisting of the ferromagnetic material in the recording layer of the above item (2).

In the magnetic storage medium as mentioned above, it is preferable that a Néel temperature of said antiferromagnetic material is not less than 400 K.

In the event that a Néel temperature of said antiferromagnetic material is not less than 400 K, generally, even if it is a temperature higher than 60° C. or so with which the magnetic storage medium is ensured in use and keeping, the antiferromagnetic material in the recording layer of the above item (2) offers an antiferromagnetism.

In the magnetic storage medium of the present invention as mentioned above, it is preferable that said antiferromagnetic material is NiO.

A Néel temperature of NiO is not less than 400 K, and NiO is an oxide. Accordingly, NiO is suitable for the antiferromagnetic material in the recording layer of the above item (2) of the magnetic storage medium.

In the magnetic storage medium wherein said antiferromagnetic material is an oxide, and said ferromagnetic material is a metallic material, it is preferable that a percentage volume of said antiferromagnetic material in said recording layer is 30 vol. %~70 vol. %.

In the event that said antiferromagnetic material is provided with the percentage volume as noted above, it is possible to expect a favorable separation between grains consisting of the ferromagnetic material.

In the magnetic storage medium of the present invention as mentioned above, it is preferable that said ferromagnetic material includes Co.

In the event that said ferromagnetic material includes Co, it is possible to obtain a magnetic storage medium which is excellent in an orientation of magnetization and is large in coercive force $H_c$.

In the magnetic storage medium of the present invention as mentioned above, it is preferable that said ferromagnetic material includes Ni or Fe.

Either of Ni and Fe offers a ferromagnetism and has a large coercive force $H_c$. This feature is suitable for the magnetic storage medium of the present invention.

In the magnetic storage medium wherein said ferromagnetic material includes Co, it is preferable that a percentage of Pt in said ferromagnetic material is 10 at % ~30 at %, and said ferromagnetic material consists of a CoPt system-alloy.

The anisotropy magnetic field $H_k$ of the ferromagnetic material of the composition referenced above is 4 kOe~8.3 kOe. In the event that the ferromagnetic material has this limit of anisotropy magnetic field $H_k$, it is possible to obtain an overwrite property of the magnetic storage medium more excellent than that (−25 dB) of a product (FUJITU AL-4) of the applicant's company.

In the magnetic storage medium wherein said antiferromagnetic material is an oxide, and said ferromagnetic material is a metallic material, it is preferable that said magnetic storage medium further comprises:

(3) a primary layer including a metallic material having a body-centered cubic structure, said primary layer being disposed between said substrate and said recording layer.

According to the magnetic storage medium having the primary layer of the above item (3), the ferromagnetic material of the recording layer of the above item (2) is favorably subjected to a hetero-epitaxial growth on an interface with the primary layer of the above item (3). Thus, it is possible to expect a favorable orientation of a magnetization in the ferromagnetic material.

In the magnetic storage medium further comprising said primary layer including a metallic material having a body-centered cubic structure, it is preferable that said metallic material included in said primary layer is Cr.

In the event that Cr is included in the primary layer of the above item (3), an interval between (110) face-to-(110) face of Cr and an interval between (002) face-to-(002) face of Co, which is used for the recording layer of the above item (2) and is excellent as the ferromagnetic material, are substantially coincident with each other. For this reason, according to the magnetic storage medium as mentioned above, the ferromagnetic material of the recording layer of the above item (2) is subjected to a hetero-epitaxial growth on an interface with the primary layer of the above item (3). Thus, it is possible to expect a favorable orientation of a magnetization in the ferromagnetic material and also to enhance the coercive force $H_c$ of the recording layer.

In the magnetic storage medium wherein said metallic material included in said primary layer is Cr, it is preferable that said primary layer consists of an alloy in which Mo or W is included in Cr, the ferromagnetic material in said recording layer consists of a CoPt system-alloy, and an interval between (110) face-to-(110) face of the alloy constituting said primary layer is larger 1.0%~2.5% than an interval between (002) face-to-(002) face of the CoPt system-alloy constituting the ferromagnetic material of said recording material.

In the magnetic storage medium as mentioned above, the recording layer of the above item (2) is subjected to a hetero-epitaxial growth on the primary layer of the above item (3) with a scope by 1.0%~2.5%. Thus, it is possible to enhance the coercive force $H_c$ of the magnetic recording layer 3 and also to provide a favorable orientation of a magnetization in the recording layer.

In the magnetic storage medium as mentioned above it is preferable said magnetic storage medium further comprises:

(4) a protective layer including C, said protective layer is disposed on a top of said recording layer.

In case of this magnetic storage medium, the protective layer of the above item (4) consists of hard particles. Thus, the recording layer of the above item (2) is protected by the protective layer of the above item (4).

DETAILED DESCRIPTION OF PREFERRED EMBODIMENTS

Hereinafter, there will be described a magnetic storage medium according to an embodiment of the present invention in conjunction with FIG. 1.

Figure 1:
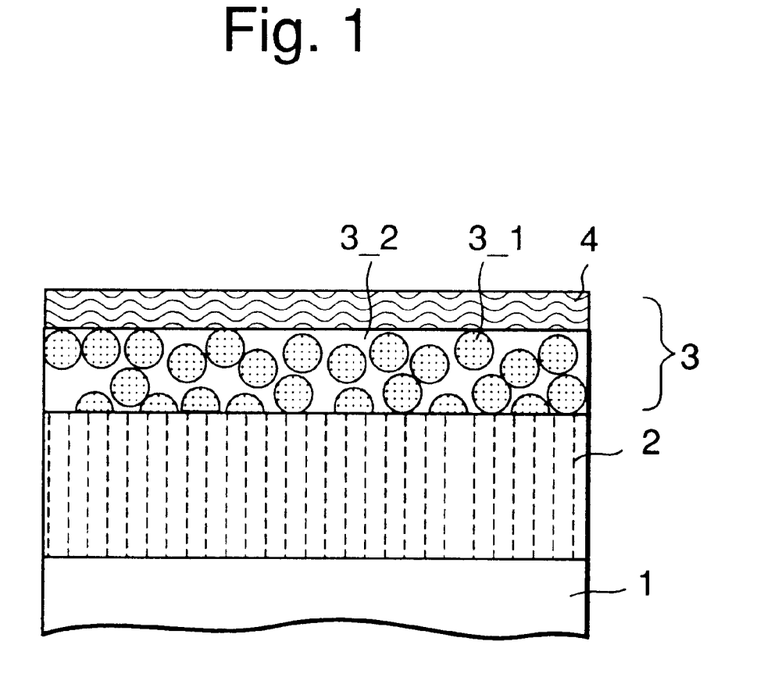
FIG. 1 is a sectional view showing a sectional structure of a magnetic storage medium (a medium structure: [Al/NiP substrate]/Cr (50 nm)/($Co_{80}Pt_{20}$)$_{40 \ vol. \ \%}$–NiO (25 nm)/C (8 nm)) according to an embodiment of the present invention.

FIG. 1 is a sectional view showing a sectional structure of a magnetic storage medium (a medium structure: [Al/NiP substrate]/Cr (50 nm)/$(Co_{so}Pt_{20})_{40\ vol.\ \%}$–NiO (25 nm)/C (8 nm)) according to an embodiment of the present invention.

The magnetic storage medium comprises an Al/NiP substrate 1, a primary layer 2, a magnetic recording layer 3 and a carbon layer 4. The Al/NiP substrate 1 is a substrate in which an aluminum substrate is coated with Nip. The Al/NiP substrate 1 corresponds to the non-magnetic substrate referred to in the present invention. The primary layer 2 having thickness of 50 nm is placed adjacent to the Al/NiP substrate 1. The magnetic recording layer 3 having thickness of 25 nm is placed on the top of the primary layer 2.

The magnetic recording layer 3 is one in which CoPt ferromagnetic crystal particles 3_1 having composition of $Co_{so}Pt_{20}$ are dispersed into NiO matrix 3_2. In the magnetic recording layer 3, the CoPt ferromagnetic crystal particles 3_1 accounts for 40 percent of the whole magnetic recording layer 3 in volume, and the NiO matrix 3_2 accounts for 60 percent of the whole magnetic recording layer 3 in volume.

The CoPt ferromagnetic crystal particles 3_1 is an alloy having a hexagonal structure offering a ferromagnetism. The magnetization of the respective crystal particles has a uniaxial crystal anisotropy in a direction perpendicular to (001) face. The CoPt ferromagnetic crystal particles 3_1 are formed in such a manner that a direction of the uniaxial crystal anisotropy is substantially coincident with a circumferential direction of the above-mentioned disk-like shaped substrate.

The NiO matrix 3_2, which divides into parts the CoPt ferromagnetic crystal particles 3_1, is an oxide having a body-centered cubic structure offering a ferromagnetism. The NiO has a high Néel temperature not less than 400 K. As shown in FIG. 1, the CoPt ferromagnetic crystal particles 3_1 are divided into parts by the NiO matrix 3_2. Consequently, no magnetic interaction acts on between CoPt ferromagnetic crystal particles 3_1-to-3_1. On the other hand, the exchange interaction acts on between a magnetization on an interface of the CoPt ferromagnetic crystal particles 3_1 offering a ferromagnetism and a magnetization on an interface of the NiO matrix 3_2 offering an antiferromagnetism.

The primary layer 2 serves to mediate between the magnetic recording layer 3 and the Al/NiP substrate 1. The primary layer 2 is formed with Cr which is a metal having a body-centered cubic structure. It is known that generally, for the primary layer, the use of the material of body-centered cubic structure rather than the material of face-centered cubic structure is excellent in orientation of magnetization of the magnetic recording layer formed adjacent to the primary layer. A face interval of (001) faces of Cr is close to a face interval of (002) faces of the CoPt alloy of CoPt ferromagnetic crystal particles 3_1. Thus, the CoPt ferromagnetic crystal particles 3_1 formed adjacent to the primary layer 2 is subjected to a hetero-epitaxial growth. Therefore, it is possible to expect a preferable orientation of magnetization of the CoPt ferromagnetic crystal particles 3_1 formed adjacent to the primary layer 2 formed adjacent to the primary layer 2. An improvement of a magnetization of the magnetic recording layer 3 makes it possible to enhance a coercive force $H_c$ of the magnetic recording layer and also to increase a regenerative output of a regenerated signal.

The above-mentioned magnetic storage medium further comprises the carbon layer 4 having a thickness of 8 nm adjacent to the top of the magnetic recording layer 3. The carbon layer 4 corresponds to the protective layer referred to in the present invention and is for protecting the magnetic recording layer 3.

A manufacturing method of the magnetic storage medium is as follows. First, Cr is laminated with 50 nm on an Al/NiP substrate in accordance with a DC spattering process. Thereafter, a CoPt target and an NiO target are simultaneously discharged in accordance with an RF spattering process so that a CoPt—NiO composite film is laminated with 25 nm. At that time, an RF bias power is applied to the substrate to promote a fine deposition of the CoPt ferromagnetic crystal particles 3_1 into the NiO matrix 3_2 offering an antiferromagnetism. At that time, a value of the RF bias is controlled in such a manner that the center of a particle-size distribution of the CoPt ferromagnetic crystal particles 3_1 is 6 nm.

Prior to comparison of characteristics of the magnetic storage medium as mentioned above according to the present embodiment with the conventional granular medium, there will be explained the structure of the conventional granular medium in conjunction with FIG. 2.

Figure 2:
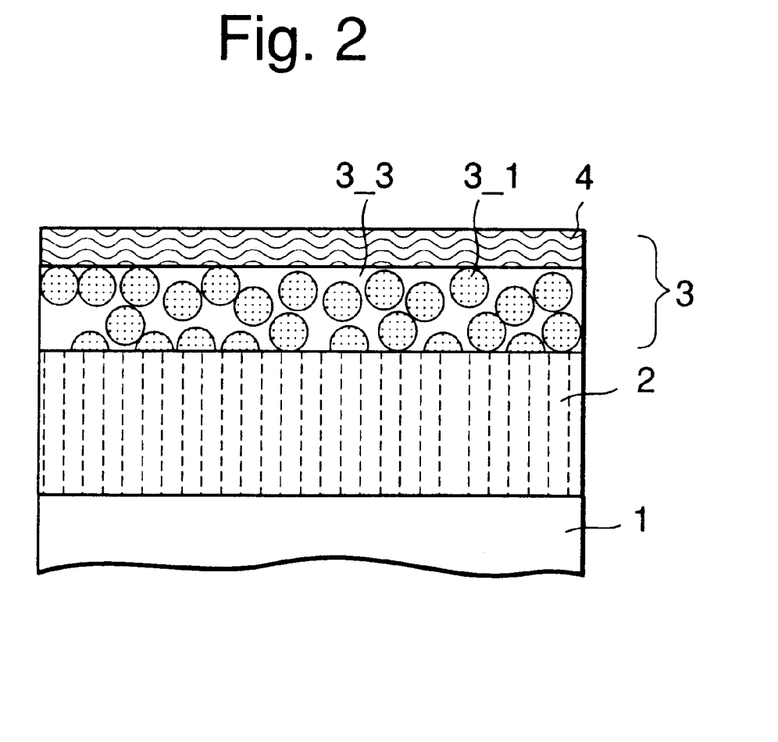
FIG. 2 is a sectional view showing a sectional structure of a granular medium ([Al/NiP substrate]/Cr (50 nm)/($Co_{80}Pt_{20}$)$_{40 \ vol. \ \%}$–$SiO_2$ (25 nm)/C (8 nm) ) according to the earlier technology.

FIG. 2 is a sectional view showing a sectional structure of a granular medium ([Al/NiP substrate]/Cr (50 nm)/$(Co_{so}Pt_{20})_{40\ vol.\ \%}$–$SiO_2$ (25 nm)/C (8 nm)) according to the earlier technology.

The conventional granular medium is different from the magnetic storage medium as mentioned above according to the present embodiment only in the point that an $SiO_2$ matrix 3_3 having no magnetic order is used instead of the NiO matrix 3_2 offering the antiferromagnetism constituting the magnetic recording layer 3, and is the same as the magnetic storage medium shown in FIG. 1. Also in the conventional granular medium, the magnetic recording layer 3 is formed in such a manner that the center of a particle-size distribution of the CoPt ferromagnetic crystal particles 3_1 is 6 nm.

As shown in FIG. 2, the CoPt ferromagnetic crystal particles 3_1 are divided into parts by the $SiO_2$ matrix 3_3. However, the $SiO_2$ matrix 3_3 is not a substance having a magnetic order such as a ferromagnetic material and an antiferromagnetic material, and thus no exchange interaction acts on between a magnetization on an interface of the CoPt ferromagnetic crystal particles 3_1 offering a ferromagnetism and a magnetization on an interface of the $SiO_2$ matrix 3_3 adjacent to the former magnetization.

Table 1 shows a result of measurement of a stability to a thermal fluctuation of the magnetic storage medium having the above-mentioned structure, and a result of measurement of $S/N_m$ when magnetic information recorded on the magnetic storage medium is regenerated. As an object of comparison, the same measurement was conducted also as to the above-mentioned granular medium, and Table 1 shows a result of measurement of those items.

TABLE 1

| Medium | $T_{90}$ | $S_{iso}/N_m$ (dB) |
|---|---|---|
| 1 | ~$10^3$ second | 33.4 |
| 2 | ~$10^{15}$ years | 33.2 |

In Table 1, $T_{90}$ denotes a stability to the thermal fluctuation, in other words, a time wherein a magnitude of a residual magnetization is attenuated up to 90% of a magnetization of the beginning of measurement at 300 K in non-magnetic field. $S_{iso}/N_m$ in Table 1 denotes a ratio of an output signal intensity $S_{iso}$ involved in regeneration of magnetic information in the state of a solitary wave having a low track recording density near 0 kFCI and medium noise $N_m$ involved in regeneration of magnetic information recorded at the track recording density of 160 kFCI. $S_{iso}/N_m$ for both media is evaluated using an MR head having a core width 1.5 μm. The left column of Table 1 shows a type of medium measured. Numeral 1 denotes the conventional granular medium, and numeral 2 denotes the magnetic storage medium according to the present embodiment as mentioned above. Numerals of four columns encircled by a top stage of columns and the left column denote measured values.

Both media of the conventional granular medium and the magnetic storage medium according to the present embodiment offered high $S_{iso}/N_m$ such as 33.4 dB and 33.2 dB, respectively. The reason why this is so is that in both media, the CoPt ferromagnetic crystal particles 3_1 are divided into parts and thus no magnetic interaction acts on between CoPt ferromagnetic crystal particles 3_1-to-3_1, and as a result unevenness of a magnetization of the magnetic recording medium 3 within the magnetization transitional region is small.

As to $T_{90}$, in case of the granular medium, $T_{90}$ of the granular medium is $10^3$ seconds or so. On the other hand, $T_{90}$ of the magnetic storage medium according to the present embodiment is $10^{15}$ years. This is longer incomparably with $T_{90}$ of the granular medium. The reason why this is so is as follows. In the magnetic storage medium according to the present embodiment, the exchange interaction acts on between magnetization of the respective interface of the CoPt ferromagnetic crystal particles 3_1 offering ferromagnetism and magnetization of an interface of the adjacent NiO matrix 3_2 offering the antiferromagnetism. As a result, magnetic anisotropy energy $K_u$ of the CoPt ferromagnetic crystal particles 3_1 is apparently increased. Thus, the CoPt ferromagnetic crystal particles 3_1 are stabilized in a direction of magnetization. Through the result of measurement as mentioned above, it would be understood that the use of the NiO matrix offering the antiferromagnetism makes it possible to greatly improve the stability to the thermal fluctuation.

As described above, magnetic information of the magnetic storage medium according to the present embodiment is stable as to the thermal fluctuation. However, as to $S/N_m$, there is a possibility that the medium noise $N_m$ is increased, since a state that the CoPt ferromagnetic crystal particles 3_1 are divided into parts is varied in accordance with a change of the ratio of the volume of the CoPt ferromagnetic crystal particles 3_1 and the volume of the NiO matrix 3_2.

Next, there will be explained changes of the medium noise according to the ratio of the volume of the CoPt ferromagnetic crystal particles 3_1 and the volume of the NiO matrix 3_2 in conjunction with FIG. 3.

Figure 3:
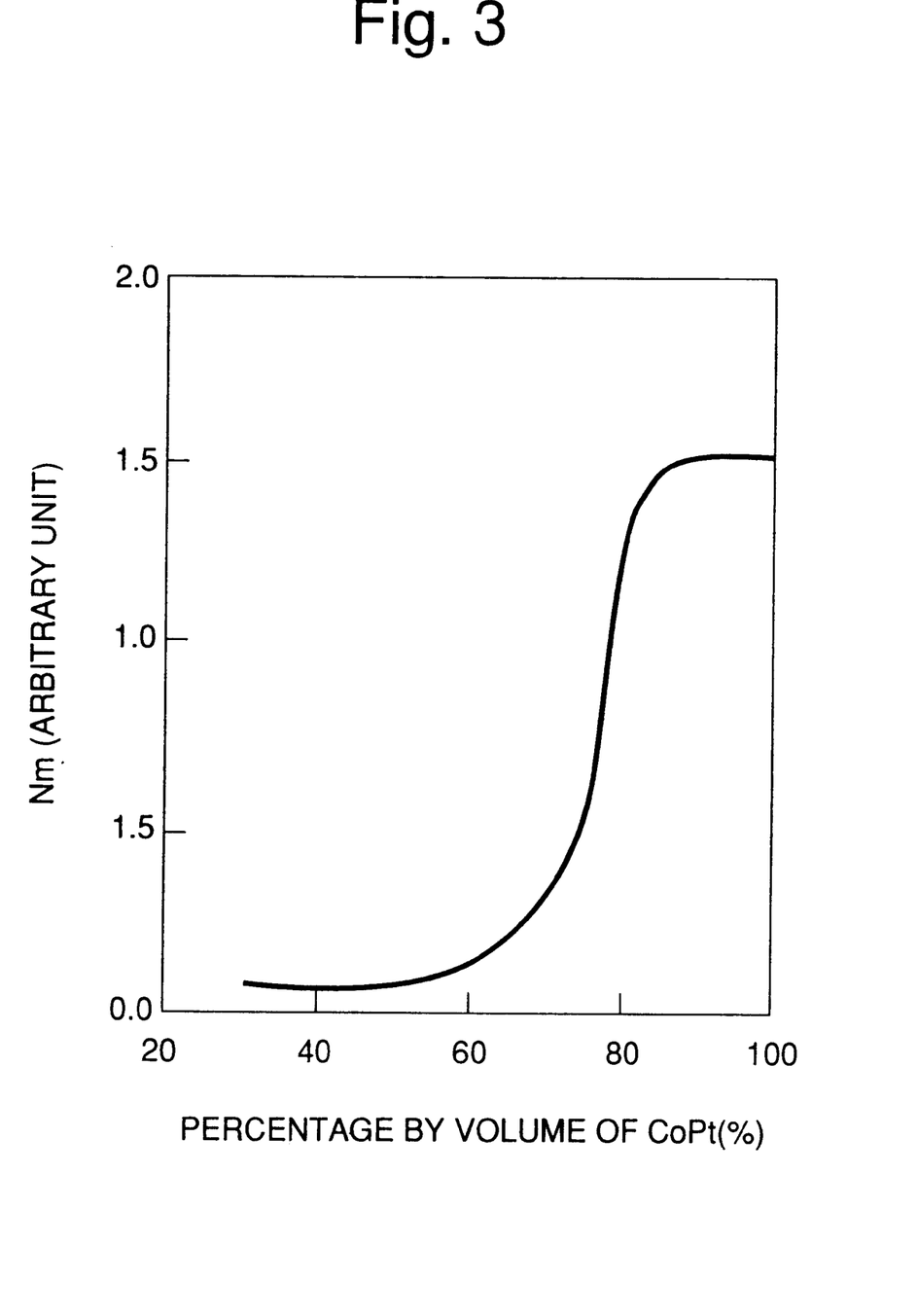
FIG. 3 is a graph showing a result of measurement of dependence of a transitional noise of a magnetic storage medium ([Al/NiP substrate]/Cr (50 nm)/($Co_{80}Pt_{20}$)$_{40 \ vol. \ \%}$–NiO (25 nm)/C (8 nm), x=30~100) according to an embodiment of the present invention to a CoPt volume ratio.

FIG. 3 is a graph showing a result of measurement of dependence of a transitional noise of a magnetic storage medium ([Al/NiP substrate]/Cr (50 nm)/$(Co_{80}Pt_{20})_{40\ vol.\ \%}$-NiO (25 nm)/C (8 nm), x=30~100) according to an embodiment of the present invention to a CoPt volume ratio.

The axis of abscissas denotes the percentage by volume of the CoPt ferromagnetic crystal particles 3_1 in the magnetic recording medium 3. The axis of ordinates denotes a magnitude of a transitional noise of a medium. Here, a particle-size of the CoPt ferromagnetic crystal particles 3_1 is constant, and only the composition of the magnetic recording medium 3 is varied. Consequently, a magnitude of the measured medium noise is representative of a magnitude of a transitional noise of a medium. A magnitude of the transitional noise indicated by the solid line in the graph is large in a case where the percentage by volume of the CoPt ferromagnetic crystal particles 3_1 in the magnetic recording medium 3 is 80%~100%. The reason why the transitional noise is large in this case is that the CoPt ferromagnetic crystal particles 3_1 are coupled with each other, so that the magnetic interaction acts on between the particles, and whereby an unevenness of a magnetization in the magnetization transitional region is large. In a case where the above-mentioned percentage by volume is less than 80%, the magnitude of the noise is small. In a case where the above-mentioned percentage by volume is 30%~70%, the magnitude of the transitional noise is less than one fifth of the magnitude of the transitional noise in a case where the above-mentioned percentage by volume is 80%~100%. The reason why this is so is that in case of this percentage by volume, the CoPt ferromagnetic crystal particles 3_1 are divided into parts by the NiO matrix 3_2, so that no magnetic interaction acts on between the particles, and whereby an unevenness of a magnetization in the magnetization transitional region is small.

As shown here, the magnetic storage medium, in which the magnetic recording medium 3 comprises the CoPt ferromagnetic crystal particles 3_1 and the NiO matrix 3_2 and the percentage by volume of the CoPt ferromagnetic crystal particles 3_1 in the magnetic recording medium 3 is 30%~70%, is stable to the thermal fluctuation and is small in the transitional noise, and thus it is suitable for a high density recording medium.

Next, it is will be explained that the magnetic storage medium, which is stable to the thermal fluctuation and is small in the medium noise, is excellent also in the overwrite characteristic. The overwrite characteristic of the CoPt ferromagnetic crystal particles 3_1 is varied in accordance with an anisotropy magnetic field $H_k$ of the CoPt ferromagnetic crystal particles 3_1, and a magnitude of the anisotropy magnetic field $H_k$ is varied in accordance with the percentage composition of Pt in the CoPt ferromagnetic crystal particles 3_1. The state of this variation will be shown in FIG. 4.

Figure 4:
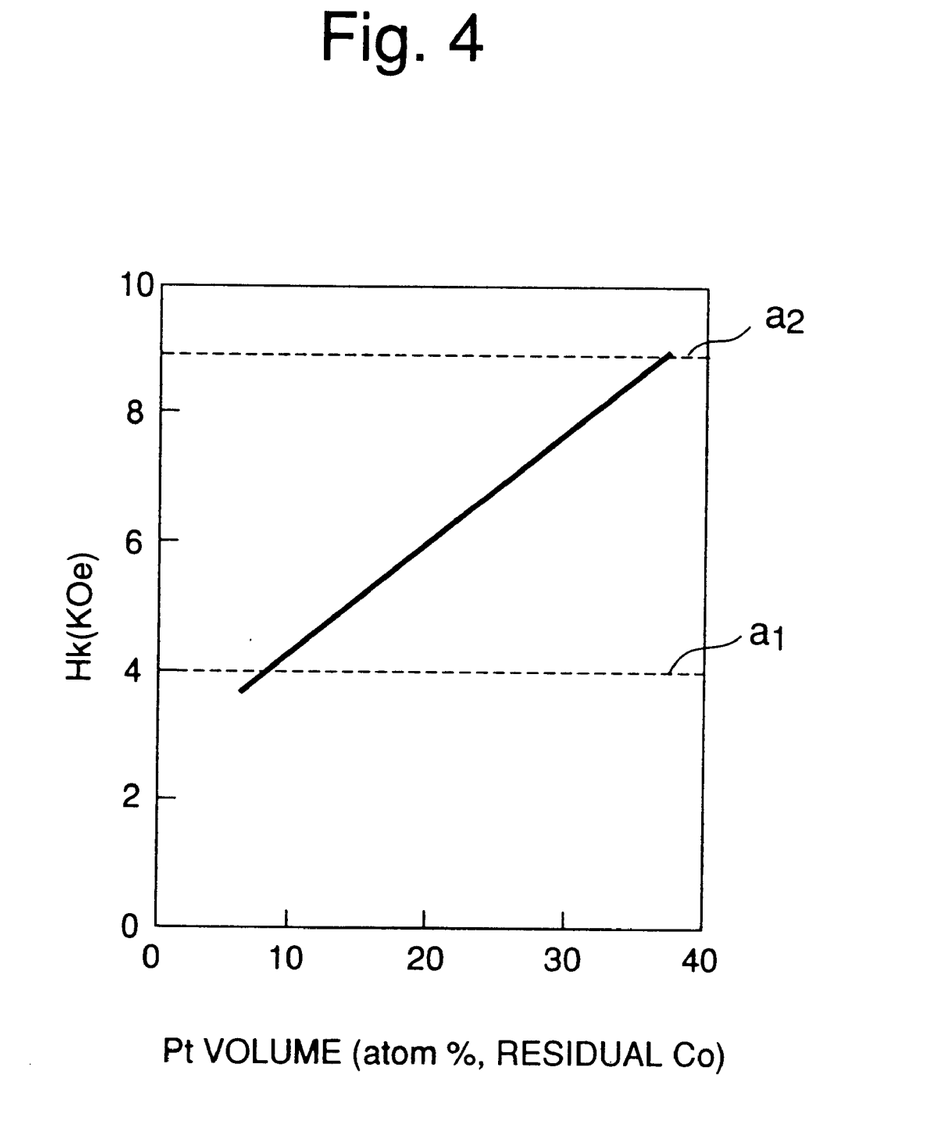
FIG. 4 is a graph showing a result of measurement of dependence of an anisotropy magnetic field $H_k$ of CoPt ferromagnetic crystal particles to a Pt composition ratio.

FIG. 4 is a graph showing a result of measurement of dependence of an anisotropy magnetic field $H_k$ of CoPt ferromagnetic crystal particles to a Pt composition ratio.

The axis of abscissas denotes the percentage composition (atom %) of the Pt in the CoPt ferromagnetic crystal particles 3_1. The axis of ordinates denotes an anisotropy magnetic field $H_k$ in unit of Oe. As illustrated with the solid line in FIG. 4, when the percentage composition of Pt is 10 atom % or so, the anisotropy magnetic field $H_k$ is 4 kOe as illustrated with the dotted line a1. When the percentage composition of Pt is increased up to 30 atom % or so, the anisotropy magnetic field $H_k$ is also increased and is 8.3 kOe as illustrated with the dotted line a2. The value 8.3 kOe corresponds to $H_{head}/0.6$ which is a value of the anisotropy magnetic field $H_k$ suitable for a writing magnetic field ($H_{head}$=5 KOe) of a head of a product (FUJITU AL-4) of the applicant's company.

Next, there will be explained in conjunction with FIG. 5 a variation of the overwrite characteristic according to the variation of the anisotropy magnetic field $H_k$ of the CoPt ferromagnetic crystal particles 3_1.

Figure 5:
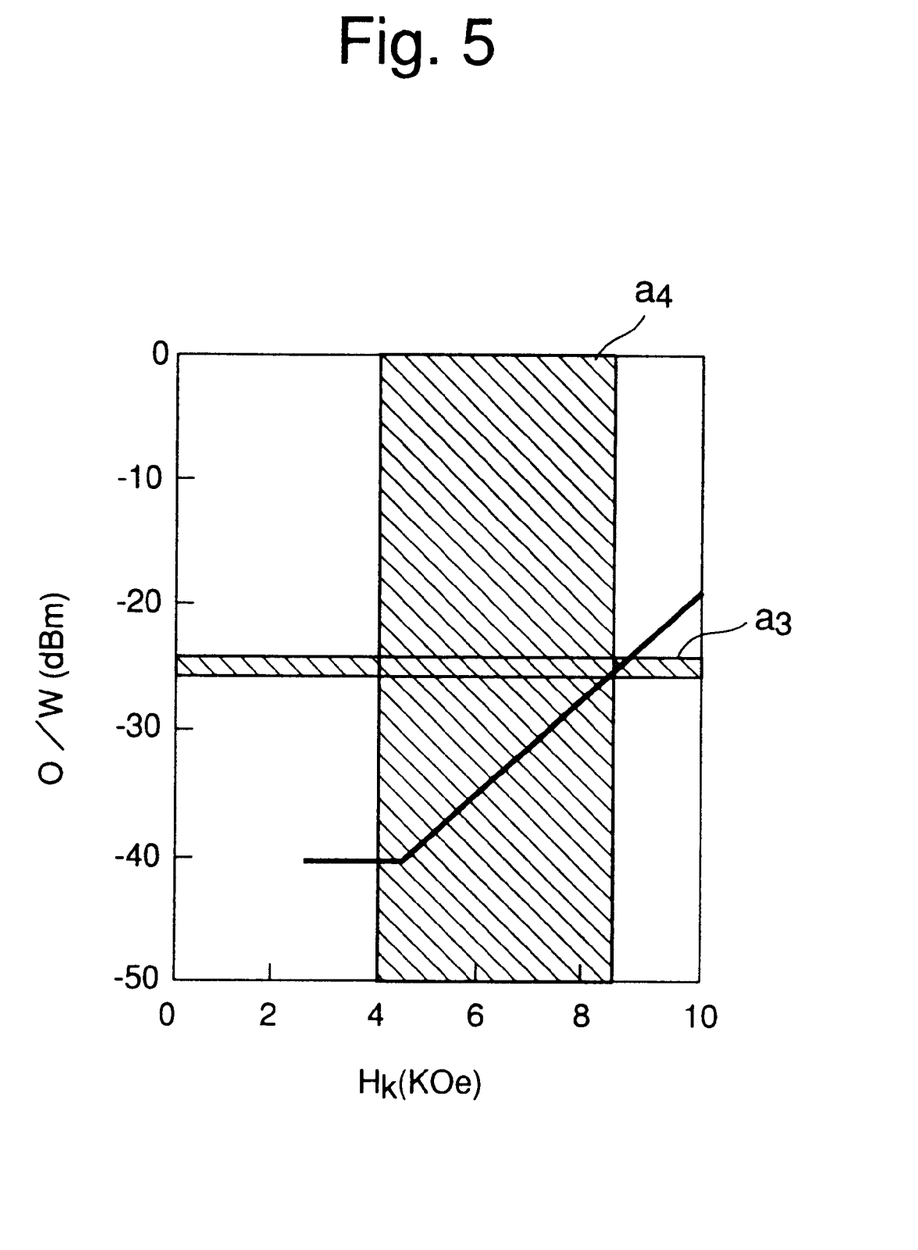
FIG. 5 is a graph showing a result of measurement of dependence of an overwrite property of a magnetic storage medium ([Al/NiP substrate]/Cr (50 nm)/($Co_{100-x}Pt_x$)$_{40 \ vol. \ \%}$–NiO (25 nm)/C (8 nm), x=0~40) according to an embodiment of the present invention to an anisotropy magnetic field $H_k$.

FIG. 5 is a graph showing a result of measurement of dependence of an overwrite property of a magnetic storage medium ([Al/NiP substrate]/Cr (50 nm)/$(Co_{100-x}Pt_x)_{40\ vol.\ \%}$–NiO (25 nm)/C (8 nm), x=0~40) according to an embodiment of the present invention to an anisotropy magnetic field $H_k$.

The overwrite property in this graph is represented by the ratio of a regenerative output of magnetic information recorded at a high track recording density to a regenerative output of magnetic information having a high track recording density, which still stay behind when the former magnetic information is subjected to the overwrite at the track recording density near 0 kFCI. The axis of abscissas of the graph indicates an anisotropy magnetic field $H_k$ of the CoPt ferromagnetic crystal particles 3_1. The axis of ordinates of the graph indicates an overwrite property (O/W) in unit of dB. The solid line in the graph denotes the O/W to the anisotropy magnetic field $H_k$. As seen from the graph, in the range of 2~4 kOe of the anisotropy magnetic field $H_k$, the O/W is –40 dB and is constant. As the anisotropy magnetic field $H_k$ exceeds 4 kOe, the O/W is increased as the anisotropy magnetic field $H_k$ is increased. When the anisotropy magnetic field $H_k$ reaches 8.3 kOe, the O/W is –25 dB.

The narrow band extending in a direction of the axis of abscissas, which is indicative of O/W=–25 dB and the vicinity, indicates –25 $dB_m$ which is a value requirement for an overwrite property of the above-mentioned product of applicant's company. It is preferable that the anisotropy magnetic field $H_k$ is less than 8.3 kOe to exceed the value –25 $dB_m$. In order that a magnitude of one bit of cell becomes small owing to recording of magnetic information on a magnetic storage medium at a high track recording density, nevertheless it is regenerated maintaining a high regenerative output, there is a need to prepare the magnetic storage medium having the ferromagnetic crystal particles 3_1 of which the anisotropy magnetic field $H_k$ has a magnitude exceeding some degree. It is preferable that the above-mentioned magnitude is not less than 4 kOe. The wide band extending in a direction of the axis of ordinates in the range of $H_k$=4~8.3 kOe indicates a preferable region of the anisotropy magnetic field $H_k$.

The CoPt ferromagnetic crystal particles 3_1 having the preferable region of the anisotropy magnetic field $H_k$ is implemented, as described above in conjunction with FIG. 4, when the percentage composition of Pt is 10~30 atom %. Thus, when the percentage composition of Pt in the CoPt ferromagnetic crystal particles 3_1 is designed to be 10~30 atom %, it is possible to provide a magnetic storage medium having a high resolution and being favorable in an overwrite property.

In order to obtain a larger regenerative output keeping the value of the anisotropy magnetic field $H_k$, which satisfies the favorable overwrite property, it is preferable that the coercive force $H_c$ is increased. This is implemented by means of increasing an orientation of magnetization of the CoPt ferromagnetic crystal particles 3_1. It is known that an orientation of magnetization of a recording layer is increased by the presence of a primary layer. Further, it is known that as the primary layer for the recording layer consisting of the CoPt alloy, Cr having a body-centered cubic structure, of which an interval between (110) face-to-(110) face is substantially matches an interval between (002) face-to-(002) face of the CoPt alloy. Addition of one type of metal of Mo and W to this Cr makes it possible to increase the above-mentioned interval between face-to-face. Next, there will be explained a variation of the coercive force $H_c$ of magnetic recording layer 3 according to an increment of the above-mentioned interval between face-to-face in conjunction with FIG. 6.

Figure 6:
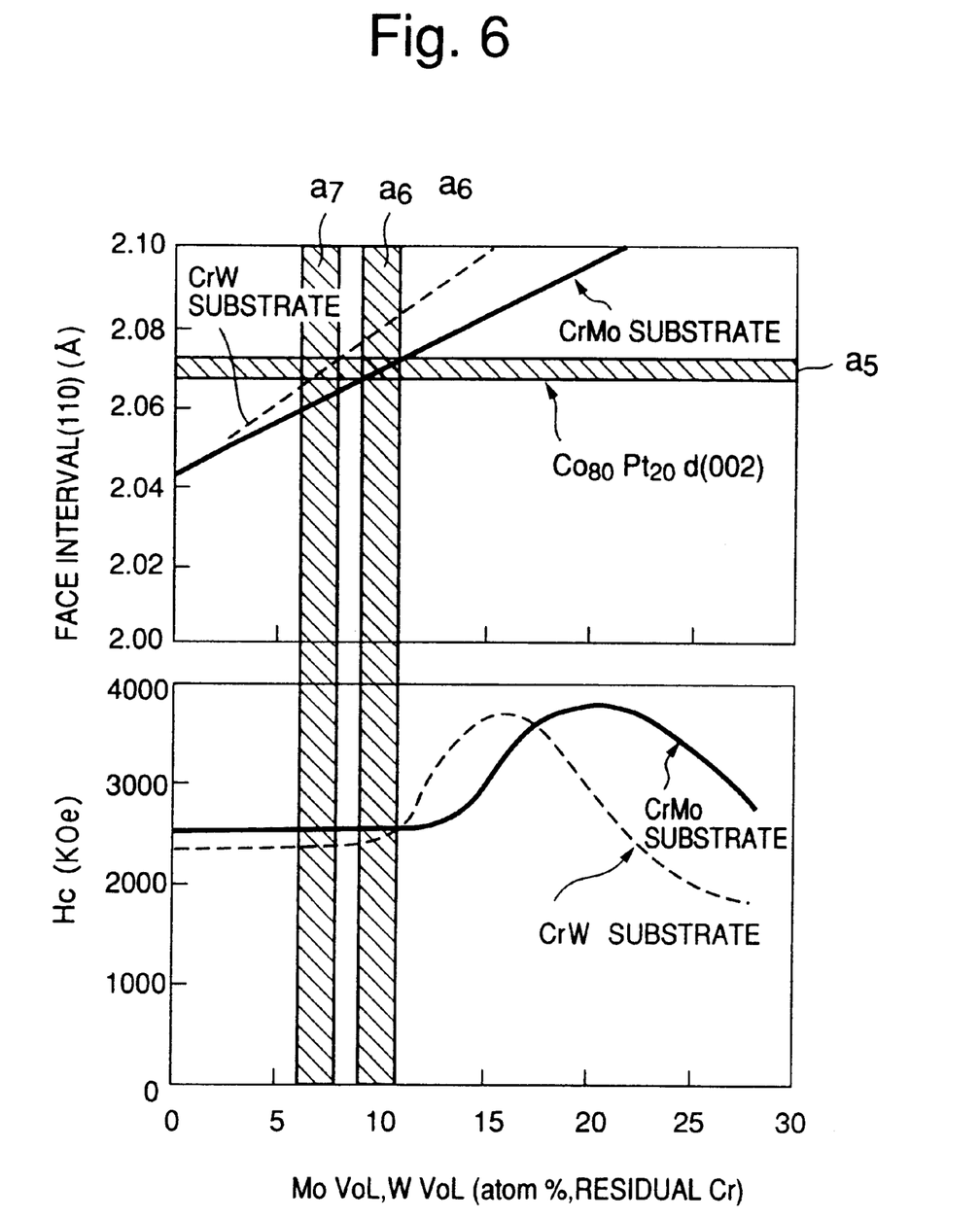
FIG. 6 is a graph showing a result of measurement of dependence of intervals between (110) face-to-(110) face of CrMo system alloy and CrW system alloy, which are used as a material of a primary layer in a magnetic storage medium ([Al/NiP substrate]/$Cr_{100-x}Mo_x$ (50 nm) or $Cr_{100-x}W_x$ (50 nm)/$(Co_{so}Pt_{20})_{40\ vol.\ \%}$–NiO (25 nm)/C (8 nm), x=0~30) according to an embodiment of the present invention, and a coercive force $H_c$ to a composition.

FIG. 6 is a graph showing a result of measurement of dependence of intervals between (110) face-to-(110) face of CrMo system alloy and CrW system alloy, which are used as a material of a primary layer in a magnetic storage medium ([Al/NiP substrate]/$Cr_{100-x}Mo_x$(50 nm) or $Cr_{100-x}W_x$ (50 nm)/$(Co_{80}Pt_{20})_{40\ vol.\ \%}$–NiO (25 nm)/C (8 nm), x=0~30) according to an embodiment of the present invention, and a coercive force $H_c$ to a composition.

FIG. 6 shows two graphs. In those graphs, the axis of abscissas indicates the percentage composition (atom %) of one type of metal of Mo and W to Cr in the primary layer 2. The axis of ordinates of an upper portion of graph indicates in unit of Å an interval between (110) face-to-(110) face of the alloy of the primary layer 2 having the body-centered cubic structure. The axis of ordinates of a lower portion of graph indicates a coercive force $H_c$ in unit of Oe. The interval between face-to-face of 2.07 Å indicated by the narrow band a5 extending in a direction of the axis of abscissas of an upper portion of graph is representative of an interval between (002) face-to-(002) face of the CoPt ferromagnetic crystal particles 3_1 in the composition of $Co_{80}Pt_{20}$.

The solid line in the graph of the upper portion in FIG. 6 indicates a variation of an interval between (110) face-to-(110) face of the alloy of CrMo to the percentage composition of Mo in the primary layer 2 in which Mo is added into Cr. The broken line in the same graph indicates a variation of an interval between (110) face-to-(110) face of the alloy of CrW to the percentage composition of W in the primary layer 2 in which W is added into Cr. The percentage composition of Mo wherein the solid line intersects the narrow band a5 is about 10 atom %, and the associated percentage composition is represented by the band a6 extending in a direction of the axis of ordinates. With this percentage of composition, the interval between (110) face-to-(110) face of the alloy of CrMo is coincident with the interval between (002) face-to-(002) face of the CoPt ferromagnetic crystal particles 3_1 in the composition of $Co_{80}Pt_{20}$.

The percentage composition of W wherein the broken line intersects the narrow band a5 is about 7 atom %, and the associated percentage composition is represented by the band a7 extending in a direction of the axis of ordinates. With this percentage of composition, the interval between (110) face-to-(110) face of the alloy of CrW is coincident with the interval between (002) face-to-(002) face of the CoPt ferromagnetic crystal particles 3_1 in the composition of $Co_{80}\ Pt_{20}$.

The solid line in the graph of the lower portion in FIG. 6 indicates a variation of a coercive force $H_c$ of the magnetic recording layer 3 according to the percentage composition of Mo in the event that the alloy of CrMo is used for the primary layer 2. The broken line in the same graph indicates a variation of a coercive force $H_c$ of the magnetic recording layer 3 according to the percentage composition of W in the event that the alloy of CrW is used for the primary layer 2. The coercive force $H_c$ of the magnetic recording layer 3 wherein the alloy of CrMo is used for the primary layer 2, which is represented by the solid line, offers a constant value of about 2500 Oe in the range of 0 atom % to 10 atom % indicated with the band a6 in the percentage composition of Mo. In exceeding 10 atom % in the percentage composition of Mo, the coercive force $H_c$ of the magnetic recording layer 3 is increased as the percentage composition of Mo is increased, and offers the maximum value exceeding 3500 Oe in the vicinity of 20 atom % in the percentage composition of Mo, and thereafter is decreased as the percentage composition of Mo is further increased.

On the other hand, the coercive force $H_c$ of the magnetic recording layer 3 wherein the alloy of CrW is used for the primary layer 2, which is represented by the broken line, offers a constant value of about 2500 Oe in the range of 0 atom % to 7 atom % indicated with the band a7 in the percentage composition of W. In exceeding 7 atom % in the percentage composition of W, the coercive force $H_c$ of the magnetic recording layer 3 is increased as the percentage composition of W is increased, and offers the maximum value exceeding 3500 Oe in the vicinity of 15 atom % in the percentage composition of W, and thereafter is decreased as the percentage composition of W is further increased.

In our review of the relation between those percentage composition and coercive force $H_c$ from the view point of the interval of face-to-face, in either case of the alloy of CrMo and the alloy of CrW, the coercive force $H_c$ is larger in the event that an interval between (110) face-to-(110) face is larger 1%~2.5% than 2.07 Å which is an interval between (002) face-to-(002) face of CoPt ferromagnetic crystal particles 3_1 having composition of $Co_{80}Pt_{20}$. The coercive force $H_c$ is maximum in vicinity of 2.07 Å in the interval between (110) face-to-(110) face.

As mentioned above, a control of the composition of the alloys of CrMo and CrW of the primary layer 2 makes it possible to control the interval between (110) face-to-(110) face of the alloy forming the primary layer 2. The CoPt ferromagnetic crystal particles 3_1 of the magnetic recording layer 3 is subjected to a hetero-epitaxial growth on the primary layer 2 with a scope by 1%~2.5%. Thus, it is possible to enhance the coercive force $H_c$ of the magnetic recording layer 3 as well as an orientation of a magnetization in the magnetic recording layer 3.

Incidentally, according to the present embodiment, the magnetic storage medium includes the primary layer 2. It is noted however that as mentioned above the primary layer 2 is to enhance the coercive force $H_c$ of the magnetic recording layer 3 as well as an orientation of a magnetization in the magnetic recording layer 3. Consequently, in the magnetic storage medium according to the present invention, even in a case where the magnetic storage medium does not include the primary layer 2, magnetic information stored therein is stable on a thermal basis, medium noise is low, and the overwrite property is appropriate.

According to the present embodiment, the ferromagnetic material is the CoPt ferromagnetic crystal particles 3_1. It is noted however that grains consisting of the ferromagnetic material referred to in the present invention are not restricted to particles, and it is acceptable that the grains are particles each having an artificially arranged configuration.

Further, according to the present embodiment, the ferromagnetic material is the CoPt ferromagnetic crystal particles 3_1. It is acceptable however that grains consisting of the ferromagnetic material referred to in the present invention are ones including Fe or Ni each offering a ferromagnetism and having a large coercive force $H_c$.

Furthermore, according to the present embodiment, as the antiferromagnetic material, there is adopted NiO. It is noted however that the antiferromagnetic material of the magnetic storage medium referred to in the present invention are not restricted to NiO, and it is acceptable that materials other than NiO are adopted. Also in such a case, it is possible to expect an effect that it is suppressed that magnetic information stored in the magnetic storage medium disappears owing to the heat.

As mentioned above, according to the present invention, it is possible to provide a magnetic storage medium capable of recording information at high recording density and also to regenerating the information with a high quality of signal (high $S/N_m$), and in addition contributing to the elongation of a life span of the recorded information by increasing a stability to thermal fluctuation of the information.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A magnetic recording disk comprising:

a non-magnetic substrate; and a recording layer in which grains consisting of a ferromagnetic material are dispersed in an antiferromagnetic material, wherein a Néel temperature of said antiferromagnetic material is not less than 400 K;

further wherein said grains are formed such that a direction of crystal anisotropy from said grains substantially corresponds to a circumferential direction of the recording disk.

2. A magnetic recording disk according to claim 1, wherein said antiferromagnetic material is an oxide, and said ferromagnetic material is a metallic material.

3. A magnetic recording disk according to claim 1, wherein said antiferromagnetic material is NiO.

4. A magnetic recording disk according to claim 2, wherein a percentage volume of said antiferromagnetic material in said recording layer is 30 vol. %~70 vol. %.

5. A magnetic recording disk according to claim 1, wherein said antiferromagnetic material includes Co.

6. A magnetic recording disk according to claim 1, wherein said ferromagnetic material includes Ni or Fe.

7. A magnetic recording disk according to claim 5, wherein a percentage of Pt in said ferromagnetic material is 10 at %~30 at %, and said ferromagnetic material consists of a CoPt system-alloy.

8. A magnetic recording disk according to claim 2, wherein said magnetic storage medium further comprises a primary layer including a metallic material having a body-centered cubic structure, said primary layer being disposed between said substrate and said recording layer.

9. A magnetic recording disk according to claim 8, wherein said metallic material included in said primary layer is Cr.

10. A magnetic recording disk according to claim 9, wherein said primary layer consists of an alloy in which Mo or W is included in Cr, the ferromagnetic material in said recording layer consists of a CoPt system-alloy, and an interval between (110) face-to-(110) face of the alloy constituting said primary layer is ~1.0%–2.5% larger than an interval between (002) face-to-(002) face of the CoPt system-alloy constituting the ferromagnetic material of said recording material.

11. A magnetic recording disk according to claim 1, wherein said magnetic storage medium further comprises a protective layer including C, said protective layer is disposed on a top of said recording layer.

* * * * *